United States Patent
Shimizu

(10) Patent No.: US 9,894,976 B2
(45) Date of Patent: Feb. 20, 2018

(54) DRAWING APPARATUS, METHOD OF CONTROLLING OPERATION OF THE DRAWING APPARATUS, AND COMPUTER READABLE RECORDING MEDIUM

(71) Applicant: CASIO COMPUTER CO., LTD., Shibuya-ku, Tokyo (JP)

(72) Inventor: Daisuke Shimizu, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/233,579

(22) Filed: Aug. 10, 2016

(65) Prior Publication Data
US 2017/0065051 A1   Mar. 9, 2017

(30) Foreign Application Priority Data

Sep. 3, 2015   (JP) ................. 2015-173461

(51) Int. Cl.
| | |
|---|---|
| G06K 15/22 | (2006.01) |
| A45D 29/00 | (2006.01) |
| G06F 3/00 | (2006.01) |
| G06T 11/20 | (2006.01) |
| B43L 13/02 | (2006.01) |
| G06K 15/02 | (2006.01) |

(52) U.S. Cl.
CPC ............ *A45D 29/00* (2013.01); *B43L 13/024* (2013.01); *G06F 3/005* (2013.01); *G06K 15/02* (2013.01); *G06T 11/20* (2013.01); *A45D 2029/005* (2013.01)

(58) Field of Classification Search
None
See application file for complete search history.

(56) References Cited

U.S. PATENT DOCUMENTS

| | | | | |
|---|---|---|---|---|
| 4,405,931 A | * | 9/1983 | Fujisawa ............... | G01D 9/30 346/139 R |
| 4,503,441 A | * | 3/1985 | Tamukai ................ | B41J 3/00 346/139 R |
| 4,504,838 A | * | 3/1985 | Tamai .................... | G01D 9/30 346/139 R |
| 4,517,576 A | * | 5/1985 | Sugawara .............. | B41J 2/49 346/139 B |

(Continued)

FOREIGN PATENT DOCUMENTS

JP    2000194838 A    7/2000

*Primary Examiner* — Ted Barnes
(74) *Attorney, Agent, or Firm* — Holtz, Holtz & Volek PC

(57) ABSTRACT

A drawing apparatus is provided. In the apparatus plural drawing tools for applying ink on an object are held by plural drawing tool holding units respectively. A drawing unit takes one of the plural drawing tools from the plural drawing tool holding units to draw an image on the object. An imaging unit images an identification image, which includes first information representing colors of inks to be applied respectively by the plural drawing tools and second information representing an arrangement of the plural drawing tools held in the plural drawing tool holding units. A controlling unit controls the drawing unit to draw a design image having at least one color on the object, based on the first and second information included in the identification image and the color of the design image.

6 Claims, 6 Drawing Sheets

(56) References Cited

U.S. PATENT DOCUMENTS

| | | | | |
|---|---|---|---|---|
| 4,533,924 | A * | 8/1985 | Takahashi | G01D 9/30 346/139 R |
| 4,754,288 | A * | 6/1988 | Lawrence | B43L 13/024 346/139 R |
| 4,970,662 | A * | 11/1990 | Tanaka | G01D 9/38 346/139 R |
| 5,027,195 | A * | 6/1991 | Cooley | G01J 3/51 348/283 |
| 5,119,114 | A * | 6/1992 | Cary | G01D 15/28 346/139 C |
| 5,437,441 | A * | 8/1995 | Tuhro | B07C 1/00 270/1.03 |
| 5,680,519 | A * | 10/1997 | Neff | H04N 1/46 347/43 |
| 6,064,493 | A * | 5/2000 | Neff | H04N 1/46 358/1.15 |
| 6,146,037 | A * | 11/2000 | Schuh | B41J 25/006 400/582 |
| 6,286,517 | B1 * | 9/2001 | Weber | A45D 29/00 132/200 |
| 6,525,724 | B1 * | 2/2003 | Takami | A45D 29/00 345/418 |
| 8,208,158 | B2 * | 6/2012 | Ishinaga | B41J 2/175 347/14 |
| 2011/0098858 | A1 * | 4/2011 | Yourlo | B41J 3/28 700/248 |
| 2016/0005229 | A1 * | 1/2016 | Lee | G06F 3/0488 345/419 |

* cited by examiner

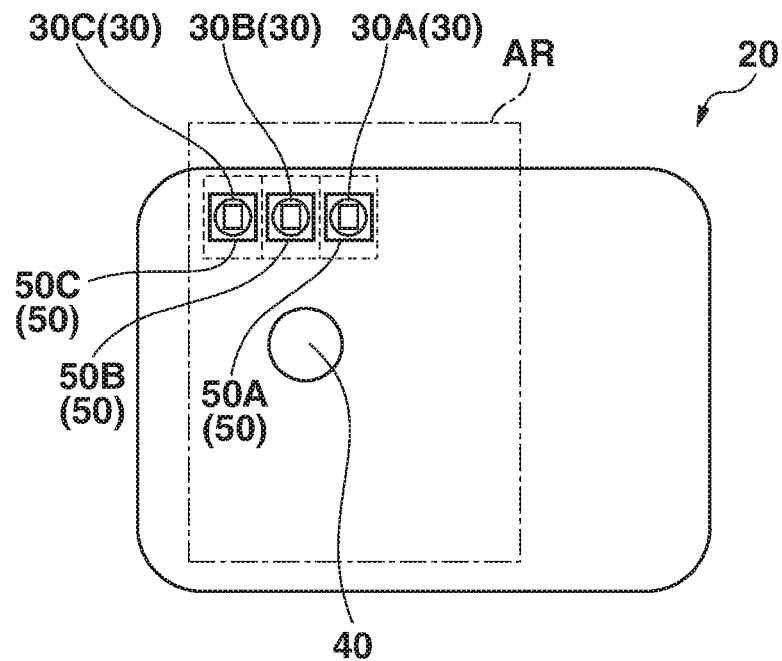
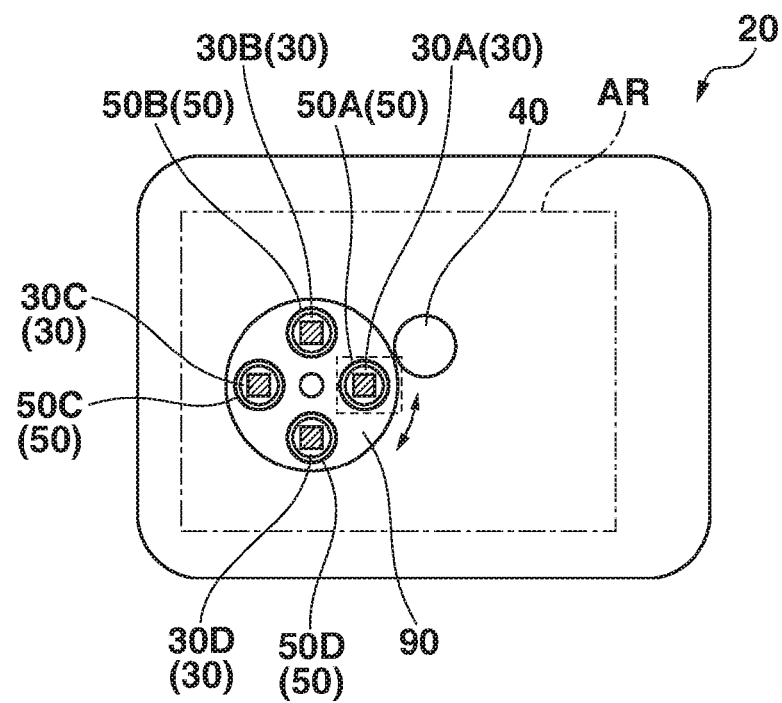

DRAWING APPARATUS, METHOD OF CONTROLLING OPERATION OF THE DRAWING APPARATUS, AND COMPUTER READABLE RECORDING MEDIUM

CROSS-REFERENCE TO RELATED APPLICATION

The present application is based upon and claims the benefit of priority from the prior Japanese Patent Application No. 2015-173461, filed Sep. 3, 2015, the entire contents of which are incorporated herein by reference.

BACKGROUND OF THE INVENTION

1. Field of the Invention

The present invention relates to a drawing apparatus, method of controlling operation of the drawing apparatus, and computer readable recording medium with a computer program stored thereon, for controlling operation of the drawing apparatus.

2. Description of the Related Art

An apparatus (hereinafter, a nail art apparatus) is disclosed by Japanese Unexamined Patent Publication No. 2000-194838, which is provided with a finger holder for holding a finger to draw a nail design on a nail of the finger. The nail art apparatus uses an ink-jet printing device to print the nail design on the finger nail.

It has been considered to employ a drawing device of a pen plotting system that uses pens to draw an image for this kind of printing device. The nail art apparatus using this kind of drawing device can use various kinds of ink including lame and/or pigments (colors) of comparatively large particle diameters and/or of high viscosity to draw an image, which is hard for the ink-jet printing machine to draw.

In the drawing device of a pen plotting system, it is required to hold the pens of predetermined colors respectively in predetermined pen holding positions. The drawing device with the pen of designated colors held in position draws an image of a nail design.

If a pen of an incorrect color is held in the pen holding position, such incorrect color could have been used to draw the nail design, and drawing the nail design will end in failure.

SUMMARY OF THE INVENTION

The present invention provides a drawing apparatus using pens of colors necessary for drawing a nail design, and method of controlling operation of the drawing apparatus, in which, even if such pens should be held in any holding positions, a nail design can be drawn in correct color, and also provides a computer readable recording medium with a computer program stored therein.

According one aspect of the invention, there is provided a drawing apparatus which comprises plural drawing tool holding units in which plural drawing tools are held respectively, each of the plural drawing tools being used for applying an ink on an object, a drawing unit which takes one of the plural drawing tools from the plural drawing tool holding units to draw an image on the object, an imaging unit which images an identification image, the identification image including first information representing colors of inks to be applied respectively by the plural drawing tools and second information representing an arrangement of the plural drawing tools held in the plural drawing tool holding units, and a controlling unit which controls the drawing unit to draw a design image having at least one color on the object, based on the first and second information included in the identification image and the color of the design image.

According to another aspect of the invention, there is provided a method of controlling operation of a drawing apparatus, wherein the drawing apparatus comprises plural drawing tool holding units in which plural drawing tools are held respectively, each of the plural drawing tools being used for applying an ink on an object, a drawing unit which takes one of the plural drawing tools from the plural drawing tool holding units to draw an image on the object, and an imaging unit, the method comprising an identification image imaging step of imaging an identification image, the identification image including first information representing colors of inks to be applied by the plural drawing tools and second information representing arrangement of the plural drawing tools held by the imaging unit, and a controlling step of controlling the drawing unit to draw a design image having at least one color on the object, based on the first and second information included in the identification image and the color of the design image.

According to other aspect of the invention, there is provided a non-transitory computer-readable recording medium having a program stored thereon for controlling operation of a drawing apparatus, wherein the drawing apparatus comprises plural drawing tool holding units in which plural drawing tools are held respectively, each of plural drawing tools being used for applying an ink on an object, a drawing unit which takes one of the plural drawing tools from the plural drawing tool holding units to draw an image on the object, a computer and an imaging unit, and the program, when installed on the computer, instructs the computer to perform the following steps: an identification image imaging step of imaging an identification image, the identification image including first information representing colors of inks to be applied by the plural drawing tools and second information representing arrangement of the plural drawing tools held by the imaging unit, and a controlling step of controlling the drawing unit to draw a design image having at least one color on the object, based on the first and second information included in the identification image and the color of the design image.

BRIEF DESCRIPTION OF THE DRAWINGS

FIG. 6A is a perspective view of the case body seen from the top, for explaining another operation of an imaging unit in the first embodiment of the invention.

FIG. 6B is a perspective view of the case body seen from the top, for explaining a rotating mechanism of pen holding units in the first embodiment of the invention.

DETAILED DESCRIPTION OF THE PREFERRED EMBODIMENTS

Figure 1:
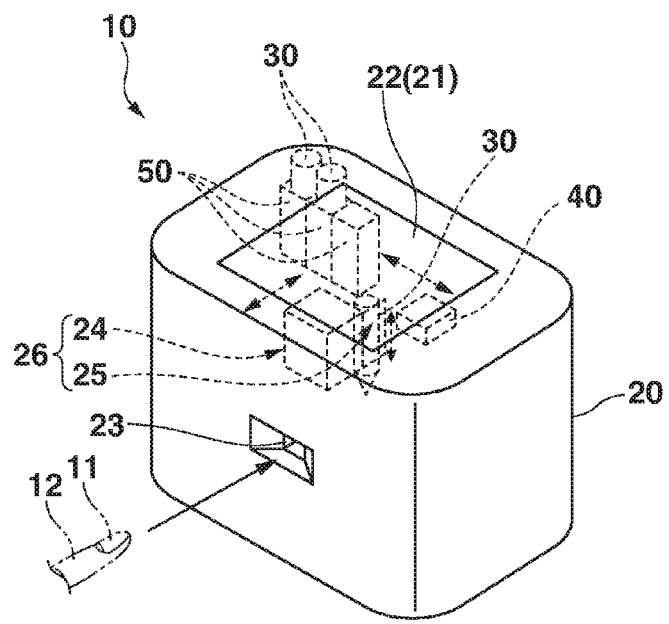
FIG. 1 is a view conceptionally showing the external appearance of a drawing apparatus according to the first embodiment of the invention.

Now, a nail printing apparatus (drawing apparatus) and a method of controlling operation of the nail printing apparatus (drawing apparatus) according to the embodiments of the present invention will be described with reference to the accompanying drawings in detail. In all the following drawings, like elements are designated by like reference numerals or like reference symbols.

In the following description of the embodiments of the invention, the drawing apparatus will be described as an apparatus for drawing an image on a nail of a finger, but the apparatus is not restricted to the apparatus for drawing an image on the finger nail but the apparatus may be used for drawing an image on a toenail.

First Embodiment of the Invention

FIG. 1 is a view conceptually showing the external appearance of the drawing apparatus according to the first embodiment of the invention.

Figure 2A:
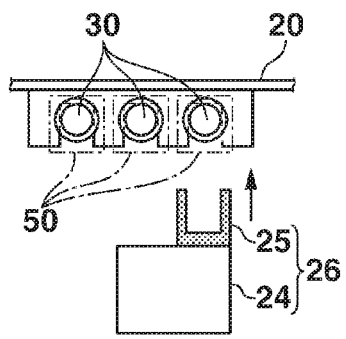
FIG. 2A, B, C is a view describing a movement of drawing tool holding units and a drawing unit of the drawing apparatus according to the first embodiment of the invention.
Figure 2B:
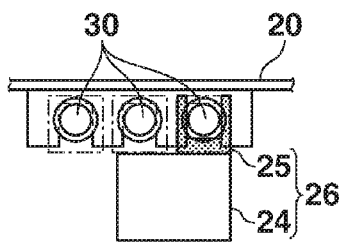
Figure 2C:
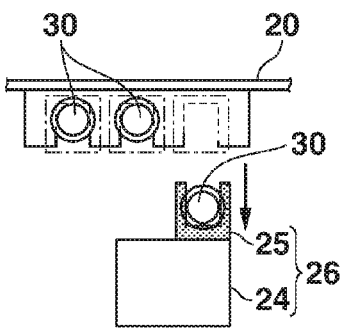

FIG. 2 is a view describing a movement of drawing tool holding units and a drawing unit of a drawing apparatus according to the first embodiment of the invention.

As shown in FIG. 1, for example, the drawing apparatus 10 is a nail printing apparatus which draws an image of a nail design (nail design image) on a nail 11 of a human finger 12.

The drawing apparatus 10 is provided with a case body 20 and a displaying unit 22 of a touch panel type. The displaying unit 22 has a function of an operation unit 21 and is provided on the top of the case body 20.

The case body 20 is provided with a finger receiving unit 23 having an opening in its front surface.

Inside the case body 20 there are provided a drawing unit 26 and imaging unit 40 (for instance, a camera). The drawing unit 26 consists of an ink jet printing unit 24 and drawing head unit 25 (for instance, a pen plotter that performs drawing an image on the finger nail by using pens (an drawing tool) 30 for applying an ink on the finger nail).

Further, inside the case body 20 there are provided plural pen holding units (drawing tool holding units) 50 for reserving plural pens (drawing tools) 30 at standby positions of the pens 30.

As shown in FIG. 1 and FIG. 2A, B, C, when the plural pens 30 are not in drawing operation, they are held respectively in the plural pen holding units 50.

When drawing an image, as shown in FIG. 2A, the drawing head unit 25 (drawing unit 26) is controlled by a moving unit 31 to be described later and moved to the position of the specified pen holding unit 50 in which a specified pen 30 used for drawing an image is held and takes the specified pen 30 from the specified pen holding unit 50 as shown in FIG. 2B, C. After the drawing head unit 25 has taken the pen 30, a drawing operation of the drawing head unit 25 is controlled by the moving unit 31, whereby the drawing head unit 25 draws a desired nail design image on the finger nail 11.

Each of the plural pens 30 has an identification information image 32 printed, affixed or displayed on its exterior surface or portion which can be imaged from the outside with said pen held in the pen holding unit 50. The identification information image 32 has information concerning the pen 30 including information that represents a color of an ink to be applied by the pen 30.

The portion of the pen 30 on which the identification information image 32 is printed, affixed or displayed is set to a position which an imaging unit 40 to be described later can image from the outside with the plural pens 30 held respectively in the pen holding units 50. For example, the identification information image 32 is printed on the portion (for instance, the rear end) of the pen 30 which can be confirmed from right above with said pen 30 held in the pen holding unit 50.

The pen holding unit 50 can detect whether the pen 30 has been held therein or not. For example, the pen holding unit 50 has a pen holding detecting switch (not shown), which is turned on when the pen has been held in the pen reserving unit 50, and is turned off when no pen is held therein.

In the vicinity of the pen holding units 50 inside the case body 20, there is provided a door (not shown), allowing a user to exchange the pen 30 held in the pen holding unit 50. The user can exchange the pen 30 held in the pen holding unit 50 with the door open.

Further, the pens 30, ink jet printing unit 24 and imaging unit 40 are moved in the front/rear direction and in the left/right direction by various kinds of moving units (not shown), and in the up and down directions as necessary, as indicated by broken arrows in FIG. 1.

Figure 3:
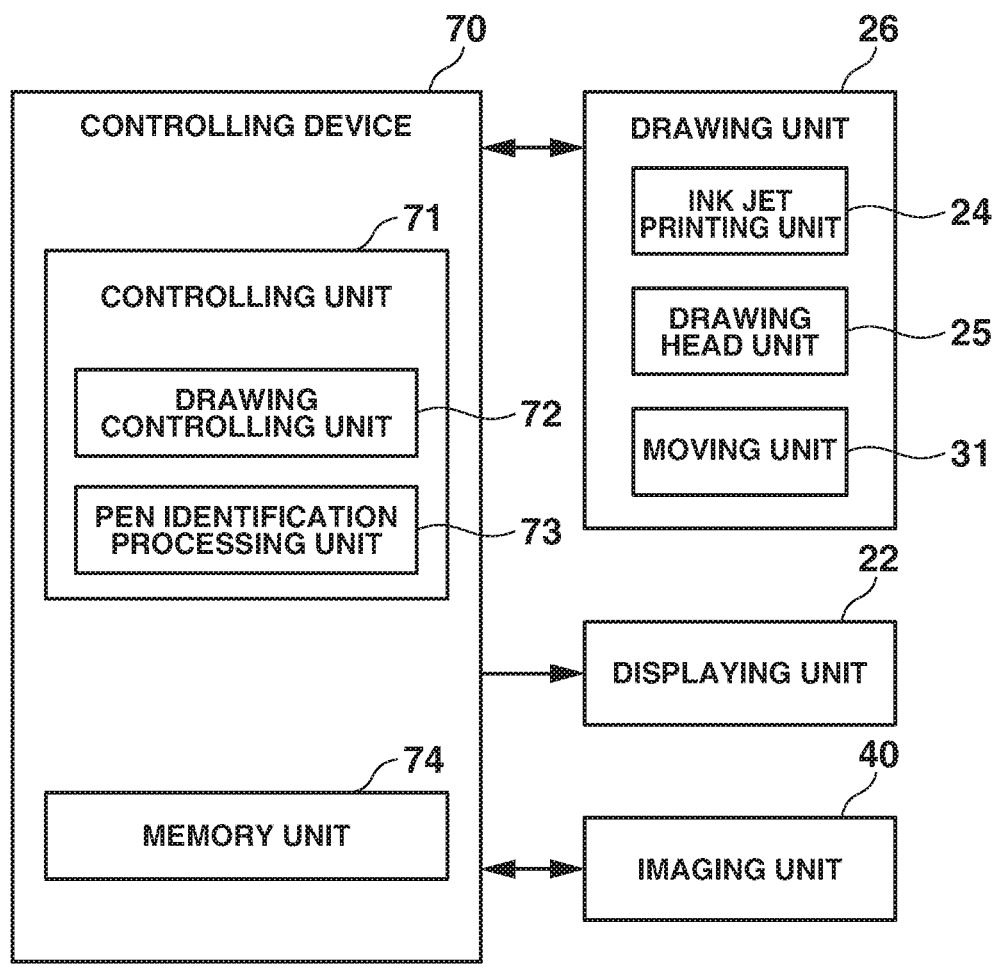
FIG. 3 is a block diagram of the configuration of a controlling system of the drawing apparatus according to the first embodiment of the invention.

A configuration of the controlling system of the drawing apparatus 10 will be described with reference to FIG. 3. FIG. 3 is a block diagram of the configuration of the controlling system of the drawing apparatus 10 according to the first embodiment of the invention.

As shown in FIG. 3, a controlling device 70 comprises a controlling unit 71 consisting of CPU (Central Processing Unit) and a memory unit 74 including ROM (Read Only Memory) and RAM (Random Access Memory).

The controlling unit 71 includes a drawing controlling unit 72 and pen identification processing unit 73. CPU of the controlling unit 71 reads and executes a program stored in ROM of the memory unit 74 to realize the functions of the drawing controlling unit 72 and pen identification processing unit 73.

The controlling device 70 is connected with the displaying unit 22, drawing unit 26 and imaging unit 40.

The drawing controlling unit 72 controls a moving unit 31 having a moving stage which moves in the front/rear direction and in the left/right direction, and in the up and down directions as necessary. Further, the moving unit 31 controls movement of the pens 30, making the same draw a nail design image on the finger nail 11 or brings the pen 30 to the pen holding units 50.

The pen identification processing unit 73 images the identification information image 32 printed, affixed or displayed on the exterior surface of each of the pens 30 or its portion which can be imaged from the outside with the pen 30 held in the pen holding units 50, and reads and cracks information included in the identification information image 32, thereby acquiring information concerning the pen 30 including information of a color of an ink to be applied by the pen 30. The detail thereof will be described later.

The imaging unit 40 images the identification information image 32 printed or attached on the exterior surface of each of the pens 30 or its portion which can be imaged from the outside with the pen held in the pen holding unit 50 and acquires an image (identification image RP). The imaging unit 40 sends the acquired identification image RP to the pen identification processing unit 73.

Further, the imaging unit 40 images an object, on which an image is to be drawn, to acquire an image of the object. In the present embodiment of the invention, the image of the object, on which an image is to be drawn, is an image which is acquired by imaging the nail 11 of the finger 12 inserted into the finger receiving unit 23. When a toe is inserted into the finger receiving unit 23, the image of the object is an image of a toenail.

Operation of Drawing Apparatus

The operation of the drawing apparatus 10 according to the first embodiment of the invention will be described with reference to FIG. 4 to FIG. 6A and FIG. 6B.

Figure 4:
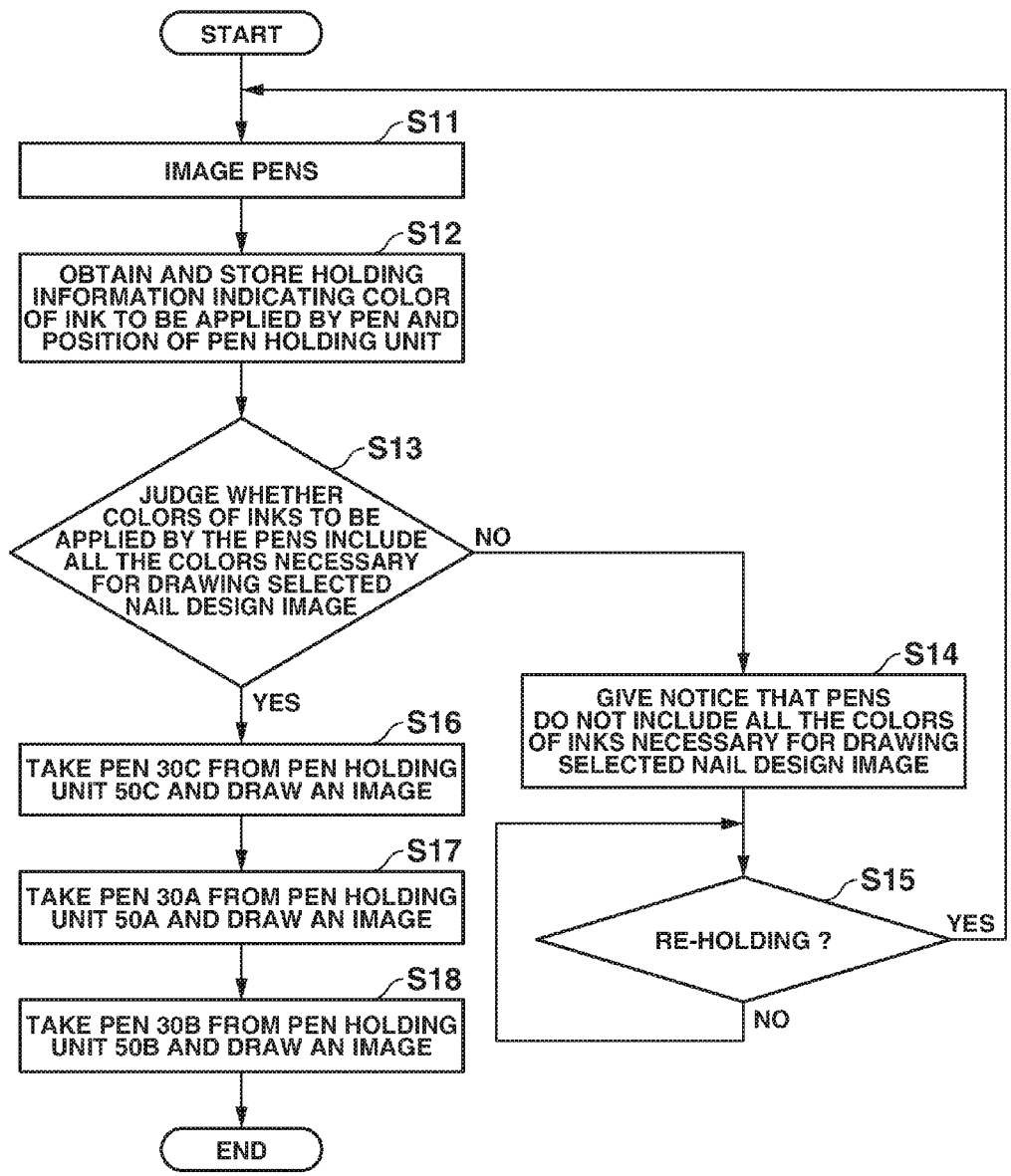
FIG. 4 is a flow chart of a drive controlling process performed in the drawing apparatus according to the first embodiment of the invention.

FIG. 4 is a flow chart of a drive controlling process performed in the drawing apparatus 10 according to the first embodiment of the invention.

Figure 5A:
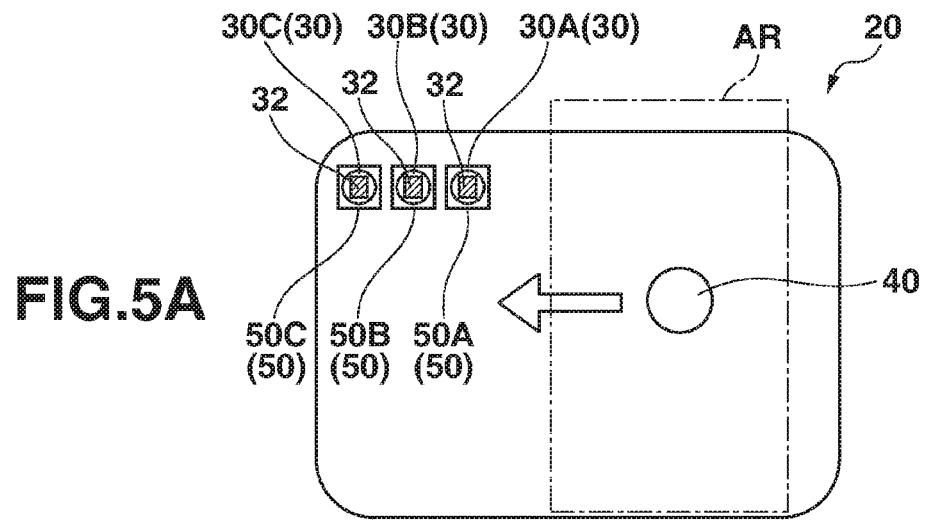
FIG. 5A is a perspective view of a case body of the drawing apparatus, seen from the top.

FIG. 5A is a perspective view of the case body 20 of the drawing apparatus 10, seen from the top.

Figure 5B:
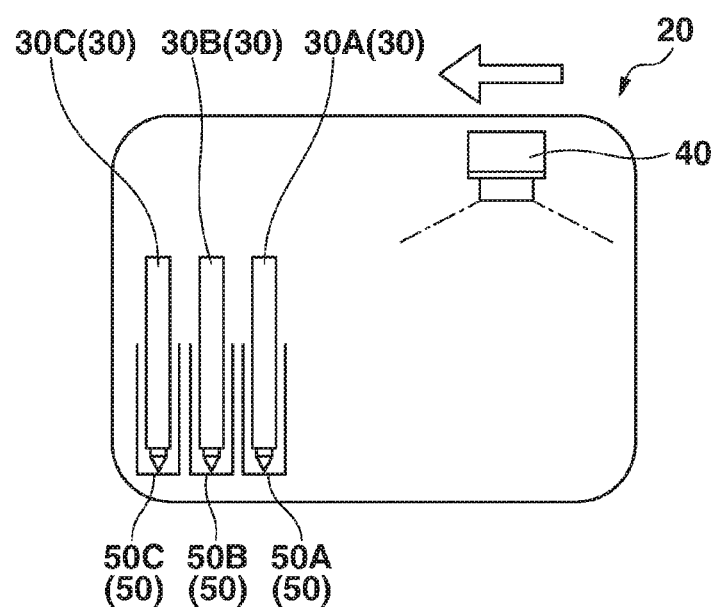
FIG. 5B is a perspective view of the case body of the drawing apparatus, seen from the side.
Figure 5C:
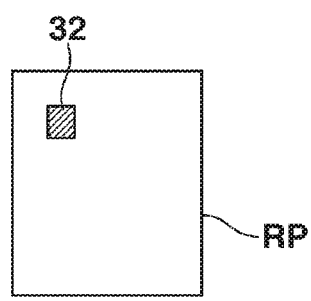
FIG. 5C is a view showing an example of an identification image in the first embodiment of the invention.

FIG. 5B is a perspective view of the case body 20 of the drawing apparatus 10, seen from the side.

In FIG. 5A and FIG. 5B, only the pen holding units 50 (50A, 50B, 50C), pens 30 (30A, 30B, 30C), and imaging unit 40 are shown, and other elements are omitted for simplicity.

The configurations and operations of the pens 30 (30A, 30B, 30C), pen holding units 50 (50A, 50B, 50C), and imaging unit 40 are described briefly, and then the whole operation of these elements will be described in detail.

As shown in FIG. 5A and FIG. 5B, there are provided the pens 30 (30A, 30B, 30C), the pen holding units 50 (50A, 50B, 50C) and imaging unit 40 within the case body 20. The pen holding units 50 (50A, 50B, 50C) detachably hold the pens 30 (30A, 30B, 30C) substantially in the vertical state, and the imaging unit 40 images the identification information images 32 of the pens 30 (30A, 30B, 30C) to acquire their images (identification images RP).

In FIG. 5A and FIG. 5B, the pens 30 are designated by reference numerals 30A, 30B, 30C, and the pen holding units 50 are designated by reference numerals 50A, 50B, 50C. The pens 30A, 30B, 30C will be collectively referred to as the pens 30, when they are collectively described. When the pens 30 are described separately, the reference numerals 30A, 30B, 30C will be used. Similarly, the pen holding units 50A, 50B, 50C will be collectively referred to as the pen holding units 50, when they are collectively described. When the pen holding units 50 are described separately, the reference numerals 50A, 50B, 50C will be used.

When the pens 30 are not used for drawing an image, that is, when the pens 30 are not in drawing operation, the pens 30 are held in the pen holding units 50, and are fitted in covers (not shown) which are provided respectively in the pen holding units 50.

On the rear end portion of each pen 30, for instance, on the exterior surface of the pen 30 or its portion which can be imaged from the outside, a two-dimensional bar code is printed or affixed. The two-dimensional bar code is used as the identification information image 32 having information concerning the pens 30 including information of a color of an ink to be applied by the pen 30. In the following description, it is assumed that the two-dimensional bar code is printed as the identification information image 32.

As shown in FIG. 5A and FIG. 5B, the imaging unit 40 is disposed above the rear end portions of the pens 30 and when imaging the identification information images 32 printed or attached on the rear end portions of the pens 30, the imaging unit 40 is moved in the direction indicated by an arrow by the moving unit (not shown) 31.

The imaging range AR of the imaging unit 40 is indicated by a chain line in FIG. 5A.

The operation of the drawing apparatus 10 will be described with reference to the flow chart of FIG. 4.

When a drawing operation starts (START in FIG. 4), the imaging unit 40 images the pens 30 held in the pen holding units 50 to acquire their identification information images 32 for identifying the pens 30 (step S11).

More specifically, as shown in FIG. 5A and FIG. 5B, the imaging unit 40 is moved in the direction indicated by the arrow by the moving unit (not shown) 31 to image the identification information images 32 of the pens 30.

When the imaging unit 40 is moved by the moving unit 31 to a position, at which the imaging range AR of the imaging unit 40 will cover an area including the first pen 30A held in the pen holding unit 50A, the imaging unit 40 images an area including the two-dimensional bar code as the identification information image 32 printed on the rear end portion of the pen 30A held in the pen holding unit 50A, thereby acquiring the identification image RP (shown in FIG. 5C) for identification the pen 30A.

The identification image RP acquired by the imaging unit 40 is acceptable, if it includes at least an area of the two-dimensional bar code, but the image is not required to include only the two-dimensional bar code.

When the imaging unit 40 is further moved in the direction indicated by the arrow by the moving unit (not shown) 31 to a position, at which the imaging range AR of the imaging unit 40 will cover an area including the second pen 30B held in the pen holding unit 50B, similarly the imaging unit 40 images the two-dimensional bar code as the identification information image 32 printed on the rear end portion of the pen 30B held in the pen holding unit 50B, thereby acquiring the identification image RP for identifying the pen 30B.

Further, when the imaging unit 40 is moved in the direction indicated by the arrow by the moving unit (not shown) 31 to a position, at which the imaging range AR of the imaging unit 40 will cover an area including the third pen 30C held in the pen holding unit 50C, the imaging unit 40 images the two-dimensional bar code as the identification information image 32 printed on the rear end portion of the pen 30C held in the pen holding unit 50C, thereby acquiring the identification image RP for identifying the pen 30C.

As described above, the imaging unit 40 images the two-dimensional bar codes as the identification information images 32 printed on the rear end portion of the pens 30 as many as the number of pens 30 held in the pen holding units 50.

In the above description, although the two-dimensional bar code has been explained as the identification information image 32 for identifying the pen 30, but there is no need to use only the two-dimensional bar code as the identification information image 32 for identifying the pen 30. For instance, it is possible to use a seal of the same color as a color of an ink to be applied by the pen 30 in place of the two-dimensional bar code. The seal is attached on the rear end portion of the pen 30, and the image of such seal is used as the identification image RP. The identification image RP can be used in place of the two-dimensional bar code to identify the color of an ink to be applied by the pen 30.

It is possible to use a transparent member to compose a container of the pen 30, allowing to see a color of the ink contained in the pen 30 from outside, and to identify the color of an ink to be applied by the pen 30 from the identification image RP acquired by imaging the pen 30.

The description returns to the flow chart of FIG. 4.

When the imaging unit 40 has finished imaging all the pens 30 and has acquired all the identification images RP of the pens 30 (step S11 in FIG. 4), then the pen identification processing unit 73 of the controlling unit 71 reads the two-dimensional bar codes in the identification images RP acquired by the imaging unit 40 to identify the color of an ink to be applied by each of the pens 30, and acquires first information indicating the color of an ink to be applied by each of the pens 30.

Further, referring to the first information indicating the color of an ink to be applied by the pen 30, the pen identification processing unit 73 recognizes the position of the pen holding unit 50 where the pen 30 referred in the first information is held, and acquires second information indicating the recognized position of the pen holding unit 50 where the pen 30 is held. Then the pen identification processing unit 73 associates the first information with the second information, and stores the associated information as holding information in a predetermined area of the memory unit 74 (step S12).

More specifically, based on the positions of the pen holding units 50 which are successively imaged by the imaging unit 40 and the identification images RP (more precisely, the two-dimensional bar codes in the identification images RP) acquired by imaging the identification information images 32 of the pens 30 held in the pen holding units 50, the pen identification processing unit 73 acquires the second information indicating the position of the pen holding unit 50 where the pen 30 is held and the first information indicating the color of an ink to be applied by the pen 30, and associates the second information with the first information, storing the associated information as the holding information in the memory unit 74.

For further details, the imaging unit 40 images the identification information image 32 of the pen 30A held in the pen holding units 50A, acquiring the identification image RP of the pen 30A. The pen identification processing unit 73 reads the two-dimensional bar code included in the identification image RP. When the pen identification processing unit 73 recognizes based on the two-dimensional bar code that a color of an ink to be applied by the pen 30A is a red image, the pen identification processing unit 73 acquires the holding information representing that a red pen 30A is held in the pen reserving unit 50A, and stores the acquired holding information in the memory unit 74.

Similarly, the identification image RP of the pen 30B is acquired from the identification information image 32 of the pen 30B held in the pen holding unit 50B. The pen identification processing unit 73 reads the two-dimensional bar code included in the identification image RP. When the pen identification processing unit 73 recognizes based on the two-dimensional bar code that a color of an ink to be applied by the pen 30B is a blue image, the pen identification processing unit 73 acquires the holding information representing that a blue pen 30B is held in the pen reserving unit 50B, and stores the acquired holding information in the memory unit 74.

Further, the identification image RP of the pen 30C is acquired from the identification information image 32 of the pen 30C held in the pen holding unit 50C. The pen identification processing unit 73 reads the two-dimensional bar code included in the identification image RP. When the pen identification processing unit 73 recognizes based on the two-dimensional bar code that a color of an ink to be applied by the pen 30C is a yellow image, the pen identification processing unit 73 acquires the holding information representing that a yellow pen 30C is held in the pen reserving unit 50C, and stores the acquired holding information in the memory unit 74.

As described above, having acquired the holding information representing in which pen holding units 50 the pens 30 of respective colors are held (step S12), the pen identification processing unit 73 judges based on said holding information, whether these colors of the inks to be drawn by pens 30 include all the colors necessary for drawing the nail design image selected by the user (step S13).

When it is determined that at least one of the colors required to draw the nail design image selected by the user are not included in these colors of the inks to be applied by pens 30 (NO at step S13), the pen identification processing unit 73 indicates on the displaying unit 22 that a pen of a certain color required to draw the nail design image is not included in the pens 30, giving the user notice that all the colors of inks required to draw the selected nail design image are not included in the pens 30, that is, the pen 30 of a certain color is not held in the pen holding units 50 (step S14).

More specifically, for instance, when the image of a nail design selected by the user needs colors such as red, blue, and green, and the red, blue, and yellow pens are previously prepared and held in the pen holding units 50, and a green pen is not held in the pen holding units 50, then the pen identification processing unit 73 displays an indication of "Please, holds a green pen" on the displaying unit 22, giving the user notice that all the pens necessary for drawing the image are not held in the units 50 and the green pen is lacking.

When the pen holding detecting switch of the pen holding unit 50 detects re-holding of the pen 30 (YES at step S15), the controlling unit 71 returns to step S11, where the imaging unit 40 images the pens 30 to acquire the images of a two-dimensional bar code, and the pen identification processing unit 73 reads the two-dimensional bar code in the images, thereby identifying colors of the images drawn by the pens 30.

When the pen holding detecting switch of the pen holding unit 50 does not detect re-holding of the pen 30 during a predetermined period of time (NO at step S15), it is possible to finish the process.

Meanwhile, when it is determined that all the pens 30 necessary for drawing the colors of the nail design image selected by the user are included in the pens 30 held in the pen holding units 50 (YES at step S13), the drawing controlling unit 72 of the controlling unit 71 takes the pens 30 from the pen holding units 50 in the order of colors necessary for drawing the nail design image selected by the user and draws the nail design image on the finger nail 11.

Now, an operation will be described, of drawing image colors in order of the colors, yellow, red, and blue.

It is assumed that the red, blue, and yellow pens 30A, 30B, and 30C are held in the pen holding units 50A, 50B, and 50C, respectively, and the relationship between the pen holding units 50 and the colors of the pens 30 held therein is stored as the holding information in the memory unit 74.

At first, in accordance with the holding information the drawing controlling unit 72 controls the moving unit (not shown) 31 to make the drawing head unit 25 take the yellow pen 30C from the pen reserving unit 50C. And the drawing head unit 25 draws a yellow image on the finger nail 11 using the pen 30C (step S16).

Further, the drawing controlling unit 72 controls the moving unit (not shown) 31 in accordance with the holding information to make the drawing head unit 25 bring the yellow pen 30C back to the original pen holding unit 50C and take the red pen 30A from the pen holding unit 50A. And the drawing head unit 25 uses the pen 30A to draw a red image on the finger nail 11 (step S17).

Finally, the drawing controlling unit 72 controls the moving unit (not shown) 31 in accordance with the holding information to make the drawing head unit 25 bring the red pen 30A back to the original pen holding unit 50A and take the blue pen 30B from the pen holding unit 50B. And the drawing head unit 25 uses the pen 30B to draw a blue image on the finger nail 11 (step S18), finishing the drawing operation.

In the present embodiment, as described above, the drawing apparatus 10 recognizes the colors of the inks that to be applied by the pens 30 held in the pen holding units 50. Therefore, if a wrong pen 30 should be held in the pen holding unit 50 and a pen of a color necessary for drawing the image is not held in the pen holding unit 50, the drawing apparatus 10 gives the user notice of the lacking color before drawing the image on the finger nail 11, prompting the user to hold a correct pen for drawing the image.

Further, since the drawing apparatus 10 recognizes in which pen holding unit 50 the pens 30 of respective colors of the inks are held, the user is only required to hold each of the plural pens 30 necessary for drawing image colors in any of the plural pen holding units 50. The user is allowed to hold the pens 30 for drawing color images in the pen holding units 50 at random, and it is possible to prevent the pen 30 held in the wrong pen reserving unit 50 from failing in drawing the nail design image.

As shown in FIG. 6A, it is possible at step S11 for the imaging unit 40 to image all the plural pens 30 at one shot. More specifically, the imaging unit 40 is moved by the moving unit 31 to an imaging position at which the imaging unit 40 can image all the pens 30 at one shot, in other words, the imaging unit 40 is moved to the imaging position at which the imaging range AR of the imaging unit 40 will cover all the pens 30 (indicated by bold dotted lines). Then the imaging unit 40 images the pens 30 to acquire the image of the two-dimensional bar codes printed respectively on the rear end portions of all the pens 30.

In this case the pen holding units 50 are disposed respectively at predetermined positions in the case body 20. Therefore, an imaging position at which the imaging unit 40 images the pens 30 is previously set and it will be possible to previously set the positions of the identification information images (two-dimensional bar codes) 32 of the pens 30 held in the pen holding units 50 in the identification image RP that the imaging unit 40 images and acquires at the imaging position, whereby the image colors drawn by the plural pens 30 held in the plural pen holding units 50 can be easily determined from one identification image RP that the imaging unit 40 images and acquires at the imaging position.

Even if the process of step S11 is performed as shown in FIG. 6A, the pen identification processing unit 73 can recognize the image color drawn by the pen 30 and the position of the pen holding unit 50 in which the pen 30 is held, thereby acquiring the holding information representing the relationship between the image color drawn by the pen 30 and the position of the pen holding unit 50 where the pen 30 is held. And the pen identification processing unit 73 can store the acquired holding information in the predetermined area of the memory unit 74 (step S12).

In this way, since the imaging unit 40 is required to image the pens 30 only once, time consumption required to perform the process at step S11 is reduced.

Another configuration of the pen holding units 50 is shown in FIG. 6B. The plural pen holding units 50 with the pens 30 held are mounted on a rotary table 90. The central rotary shaft of the rotary table 90 is connected to a rotating mechanism (for instance, a motor).

The rotary table 90 rotates to move the pen holding unit 50, bringing the pen 30 held in said pen holding unit 50 to an operating position of the pen 30.

In the above configuration of the pen holding units 50 mounted on the rotary table 90, the imaging unit 40 is arranged to acquire the identification image RP for identifying the image color drawn by one of the pens 30 which has been brought to its operating position.

In this case, the rotating mechanism rotates the rotary table 90 to move the pen holding units 50 with the pens 30 held therein, successively bringing the pens 30 to the operating position (the area indicated by the bold dotted line) one by one, thereby allowing the imaging unit 40 to image the pen 30 brought to the operating position and acquire the identification image RP for identifying the image color drawn by said pen 30. In this case, the relationship between the pen holding unit 50 and the image color drawn by the pen 30 held therein is acquired as the holding information.

In the configuration shown in FIG. 6B, by way of example the imaging range AR of the imaging unit 40 is set to a range which includes all the pen holding units 50 mounted on the rotary table 90. But it is sufficient for the imaging unit 40, if the imaging unit 40 can acquire an image at least necessary for identifying the image color drawn by one pen 30 brought to the operating position. The imaging unit 40 is not required to have a wide-angle imaging range AR but a narrow imaging range AR will be sufficient, if an image can be acquired, necessary for identifying the image color drawn by one pen 30 brought to the operating position.

Further, in the configuration of the pen holding units 50 mounted on the rotary table 90, such arrangement may be possible that images the plural pens 30 together at one shot to acquire the image necessary for identifying the image colors drawn by the pens 30, as described with reference to FIG. 6A.

Second Embodiment of the Invention

The drawing apparatus according to the second embodiment of the invention will be described with reference to FIG. 7A, FIG. 7B and FIG. 7C.

The drawing apparatus according to the second embodiment has substantially the same configuration as the first embodiment. Only the different parts will be described. In FIG. 7A, FIG. 7B and FIG. 7C, like parts as those in the first embodiment are designated by like reference numerals and like reference symbols, and their description will be omitted.

Figure 7A:
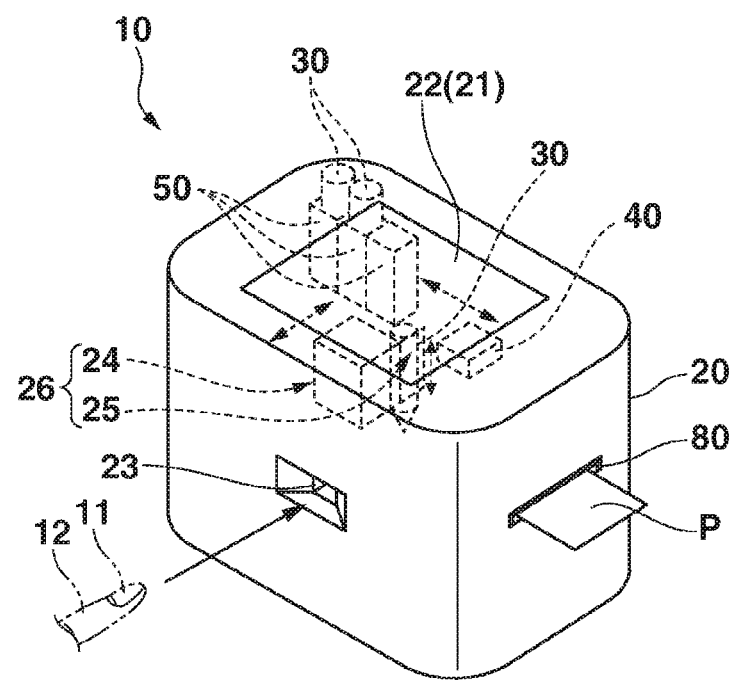
FIG. 7A is a view showing the external appearance of the drawing apparatus according to the second embodiment of the invention.
Figure 7B:
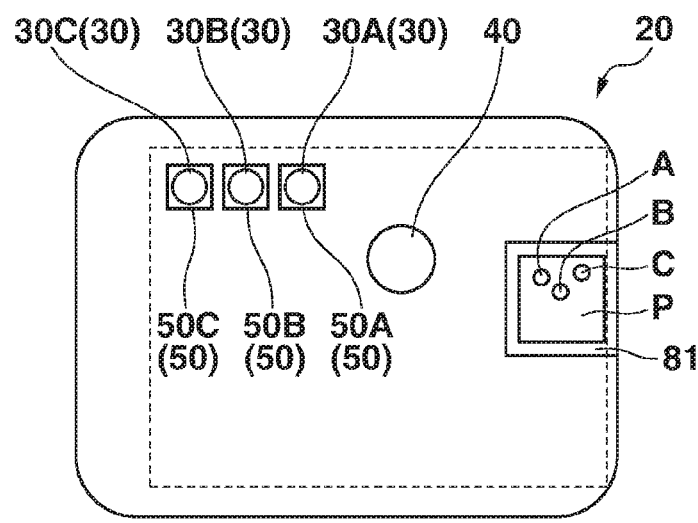
FIG. 7B is a perspective view of the case body of the drawing apparatus of the second embodiment, seen from the top.

As shown in FIG. 7A and FIG. 7B, the drawing apparatus 10 according to the second embodiment has an drawing medium receiving opening 80 on the side wall of its case body 20.

Inside the drawing medium receiving opening 80 there is provided a test-writing portion 81 which receives an drawing medium P. The drawing medium (paper medium) P is used for test-writing. For instance, in order not to draw a nail design image on the finger nail 11 with the pen 30 in bad ink-supply condition, the test-writing is performed using the pen 30 to put ink supply of the pen 30 into a better condition for drawing the image. It is possible to add this test-writing configuration to the drawing apparatus 10 according to the first embodiment.

In the drawing apparatus 10 according to the second embodiment, the function of the test-writing process (drawing confirming process) is used to identify the image color drawn by the pen 30. The detail of the test-writing process will be described hereinafter.

The moving unit (not shown) 31 moves to the pen holding unit 50A to make the drawing head unit 25 take the pen 30A and brings the pen 30A to the position of the paper medium P. And the moving unit 31 operates the pen 30A to draw a design "A" such as a circle, triangle and a cross on the paper medium P, thereby putting the ink supply of the pen 30A into a better condition (test-writing "A").

Figure 7C:
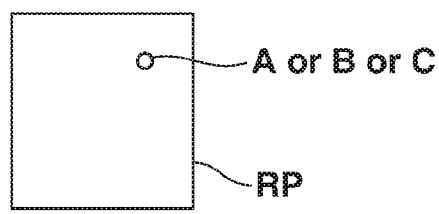
FIG. 7C is a view showing an example of an identification image in the second embodiment of the invention.

Then, the imaging unit 40 images the design "A" that has been drawn on the paper medium P in the test-writing "A" of the pen 30A held in the pen holding unit 50A and acquires the identification image RP (as shown in FIG. 7C) for identifying the pen 30A.

Similarly, the moving unit (not shown) 31 moves to the pen holding unit 50B to make the drawing head unit 25 take the pen 30B and brings the pen 30B to the position of the paper medium P. And the moving unit 31 operates the pen 30B to draw a design "B" similar to the design "A" on a blank space of the paper medium P (test-writing "B").

Then, the imaging unit 40 images the design "B" that has been drawn on the paper medium P in the test-writing "B" of the pen 30B held in the pen holding unit 50B and acquires the identification image RP (as shown in FIG. 7C) for identifying the pen 30B.

Further, the moving unit (not shown) 31 moves to the pen holding unit 50C to make the drawing head unit 25 take the pen 30C and brings the pen 30C to the position of the paper medium P. And the moving unit 31 operates the pen 30C to draw a design "C" similar to the design "A" on a blank space of the paper medium P (test-writing "C").

Then, the imaging unit 40 images the design "C" that has been drawn on the paper medium P in the test-writing "C" of the pen 30C held in the pen holding unit 50C and acquires the identification image RP (as shown in FIG. 7C) for identifying the pen 30C.

The moving unit 31 and imaging unit 40 repeatedly performs the above operations with respect to all the pens 30 held in the pen holding units 50.

Similarly to the first embodiment, the imaging unit 40 successively images the images which have been drawn in the test-writing by the pens held respectively in the pen holding units 50 to acquire the identification images RP for identifying the pens 30.

Based on the identification image RP, the pen identification processing unit 73 acquires the holding information representing the relationship between the pen holding unit 50 and the image color drawn by the pen held therein, and stores the acquired holding information in the memory unit 74.

In a substantially same manner as in the first embodiment of the invention, the drawing apparatus 10 according to the second embodiment recognizes the image colors that are drawn by the pens 30 held in the pen holding units 50. Therefore, even if a wrong pen 30 is held in the pen holding unit 50 and the pen of a necessary color is absent, the drawing apparatus 10 can give the user notice of the lacking color, prompting to prepare and hold the correct pen 30 of the color necessary for drawing the image before drawing the image on the finger nail 11.

Further, the drawing apparatus 10 recognizes that in which pen holding unit 50 the pens 30 of respective colors are held. Therefore, the user is allowed to hold the plural pens 30 of necessary colors in any pen holding units 50. The user is not required to hold the pen of a predetermined color in the predetermined pen holding unit 50. In the same way as in the first embodiment, the user is prevented from holding the pen 30 in a wrong pen holding unit 50 and the failure in drawing the nail design image is prevented in the second embodiment, too.

Although specific embodiments of the invention have been described in the above detailed description, it will be understood that the invention is not limited to the particular embodiments described herein.

For instance, in the above description the two-dimensional bar code has been described as having only information for identifying the color used to draw the image. But it is possible to include additional information other than the information of colors in the two-dimensional bar code. Information representing a model number and ink capacity of the pen 30 can be contained in the two-dimensional bar code, and when the information of ink capacity of the pen 30 is recognized from the identification image RP, it will be possible to give the user notice of the time for replacing the pen 30 based on the ink capacity and the frequency of use of the pen 30.

A transparent color can be used as a color of the pen 30 for the purpose of coating the surface of the image drawn on the finger nail 11.

Modifications and rearrangements may be made to the disclosed embodiments while remaining within the scope of the invention as defined by the following claims. It is intended to include all such modifications and rearrangements in the following claims and their equivalents.

What is claimed is:

1. A drawing apparatus comprising:
   a plurality of drawing tool holding units in which a plurality drawing tools are held, respectively, each of the plurality of drawing tools being configured to apply ink on an object;
   a drawing confirming structure which is provided with a drawing medium that is different from the object;
   a drawing mechanism which draws an image on the object or the drawing medium with at least one of the plurality of drawing tools held in the plurality of drawing tool holding units; and
   a processor which executes a program stored in a memory to perform operations including:
      controlling the drawing mechanism to draw images on areas of the drawing medium with the plurality of drawing tools, respectively;
      obtaining drawing-tool holding information that includes first information representing colors of ink respectively applied by the plurality of drawing tools and second information representing an arrangement of the plurality of drawing tools in the plurality of drawing tool holding units, the first information and the second information being obtained with respect to each of the plurality of drawing tools by detecting, in an identification image of the drawing medium, a color and a position of the area of the image drawn with the drawing tool on the drawing medium; and
      controlling the drawing mechanism to draw a design image having at least one color on the object, based on the drawing-tool holding information and the at least one color of the design image.

2. The drawing apparatus according to claim 1, wherein when the drawing mechanism uses a specific drawing tool among the plurality of drawing tools to draw the design image on the object, the processor designates the drawing tool holding unit that holds the specific drawing tool, from among the plurality of drawing tool holding units, and controls the drawing mechanism to take the specific drawing tool from the designated drawing tool holding unit.

3. The drawing apparatus according to claim 1, wherein:
the object is a fingernail or a toenail; and
the drawing medium is a piece of paper.

4. The drawing apparatus according to claim 1, further comprising:
a display;
wherein the processor executes the program stored in a memory to perform further operations including:
comparing the colors of ink respectively applied by the plurality of drawing tools represented in the first information with colors required to draw the design image, to judge whether the colors of ink respectively applied by the plurality of drawing tools include all of the colors required to draw the design image; and
when it is determined that at least one of the colors required to draw the design image is not included in the colors of ink respectively applied by the plurality of drawing tools, displaying on the display that a drawing tool required to draw the design image is lacking, thereby notifying a user of the lacking drawing tool.

5. A method of controlling operation of a drawing apparatus comprising (i) a plurality of drawing tool holding units in which a plurality drawing tools are held, respectively, each of the plurality of drawing tools being configured to apply ink on an object, (ii) a drawing confirming structure which is provided with a drawing medium that is different from the object, and (iii) a drawing mechanism which draws an image on the object or the drawing medium with at least one of the plurality of drawing tools held in the plurality of drawing tool holding units, the method comprising:
controlling the drawing mechanism to draw images on areas of the drawing medium with the plurality of drawing tools, respectively;
obtaining drawing-tool holding information that includes first information representing colors of ink respectively applied by the plurality of drawing tools and second information representing an arrangement of the plurality of drawing tools in the plurality of drawing tool holding units, the first information and the second information being obtained with respect to each of the plurality of drawing tools by detecting, in an identification image of the drawing medium, a color and a position of the area of the image drawn with the drawing tool on the drawing medium; and
controlling the drawing mechanism to draw a design image having at least one color on the object, based on the drawing-tool holding information and the at least one color of the design image.

6. A non-transitory computer-readable recording medium having a program stored thereon that is executable by a computer of a drawing apparatus comprising (i) a plurality of drawing tool holding units in which a plurality drawing tools are held, respectively, each of the plurality of drawing tools being configured to apply ink on an object, (ii) a drawing confirming structure which is provided with a drawing medium that is different from the object, and (iii) a drawing mechanism which draws an image on the object or the drawing medium with at least one of the plurality of drawing tools held in the plurality of drawing tool holding units, the program being executable by the computer to perform operations comprising:
controlling the drawing mechanism to draw images on areas of the drawing medium with the plurality of drawing tools, respectively;
obtaining drawing-tool holding information that includes first information representing colors of ink respectively applied by the plurality of drawing tools and second information representing an arrangement of the plurality of drawing tools in the plurality of drawing tool holding units, the first information and the second information being obtained with respect to each of the plurality of drawing tools by detecting, in an identification image of the drawing medium, a color and a position of the area of the image drawn with the drawing tool on the drawing medium; and
controlling the drawing mechanism to draw a design image having at least one color on the object, based on the drawing-tool holding information and the at least one color of the design image.

* * * * *